Feb. 13, 1962   W. H. PEET   3,020,928
ACCUMULATOR
Original Filed Aug. 6, 1958   2 Sheets-Sheet 1

INVENTOR.
WILLIAM HAROLD PEET
BY *Whittemore Hulbert & Belknap*
ATTORNEYS

Feb. 13, 1962 W. H. PEET 3,020,928
ACCUMULATOR

Original Filed Aug. 6, 1958 2 Sheets-Sheet 2

INVENTOR.
WILLIAM HAROLD PEET
BY Whittemore, Hulbert &
Belknap
ATTORNEYS

United States Patent Office 3,020,928
Patented Feb. 13, 1962

3,020,928
ACCUMULATOR
William Harold Peet, 2115 Devonshire Road,
Ann Arbor, Mich.
Continuation of application Ser. No. 753,521, Aug. 6, 1958. This application Oct. 2, 1961, Ser. No. 143,025
10 Claims. (Cl. 138—30)

The present invention relates to improvements in an accumulator for use as a pressure storage unit and in absorbing or suppressing surges or pulsations in the operation of fluid pressure equipment, thus insuring a desired high and uniform output or discharge pressure to a device or devices serviced by the accumulator or in a hydraulic system. The present improvements pertain to an accumulator of the tubular diaphragm type illustrated and described in my Letters Patent 2,760,518 of August 28, 1956.

The present application is a continuation of my copending application Serial No. 753,521, filed August 6, 1958.

An object of the invention is to provide an accumulator of simple and inexpensive construction featuring a flexible tubular diaphragm disposed coaxially within an elongated cylindrical casing, in which an improved internal backing core structure is provided for the diaphragm. This structure is such as to permit relatively free and unimpeded flow of liquid between the interior and exterior of the core, as well as to obtain an improved uniformity of its distribution along the core, while at the same time preventing an extrusion action by the core on the material of the diaphragm under external pressure.

Another object is to provide an accumulator of the type described, in which the diaphragm backing core referred to is provided by a multiplicity of fibrous windings or individual wafers arranged end to end within the diaphragm to constitute a liquid permeable backing core, with longitudinal passages in this core occupied by fluted control elements to most efficiently direct and distribute the flow of liquid in the longitudinal sense relative to the core, and for radial distribution and flow through the latter.

Another object is to provide an accumulator as described in which the control elements referred to are of solid, generally circular cross section and are provided with parallel longitudinal flutings of relatively small size formed about their periphery and extending along the length thereof, through which flutings the pressure liquid flows in substantial volume, without excessive turbulence and with uniform distribution. Improved operation of the accumulator in respect to pressure control is the result.

Another object is to provide an accumulator in which flow control elements of this sort are sustained at their opposite ends by opposed end members of the accumulator, thus to properly support the windings or wafers within the tubular diaphragm.

A further object is to provide an accumulator in which the diaphragm backing core is of an improved external outline to increase the range of expanding and contracting movements of the surrounding diaphragm.

More specifically, in accordance with the invention the fluid permeable core, as sustained by the fluted flow control members, is of a novel external outline characterized by radial projections having enlarged rounded end protuberances, knobs or nodes, with an intermediate portion of restricted cross section disposed between and spacing these protuberances. In accordance with one adaptation of the invention, the permeable core thus constituted includes a pair of rounded enlargements of circular outline spaced by a center strut portion, hence is in the general shape of the numeral 8; while in another form three rounded protuberances or nodes are spaced by an intermediate member of a three armed, spider-like shape.

The foregoing as well as other objects will become more apparent as this description proceeds, especially when considered in connection with the accompanying drawings illustrating preferred embodiments of the invention, wherein.

Figure 1:
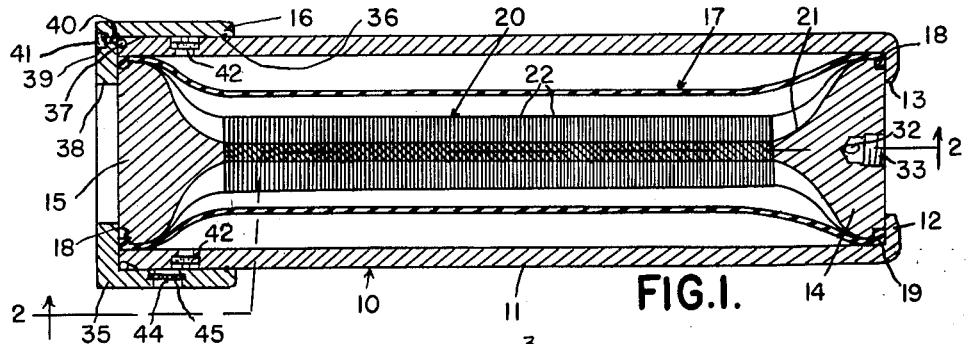
FIG. 1 is a view in axial section through an accumulator in accordance with one embodiment of the invention.
Figure 2:
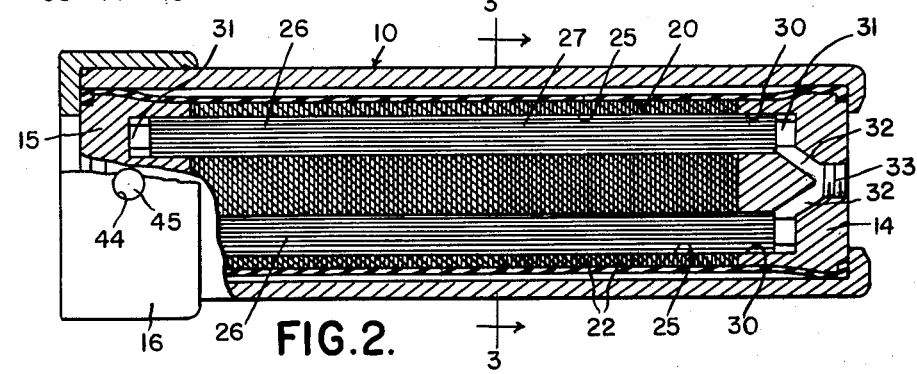
FIG. 2 is a bottom plan view of the accumulator of FIG. 1, being partially broken away and axially sectioned along broken line 2—2 of FIG. 1.
Figure 3:
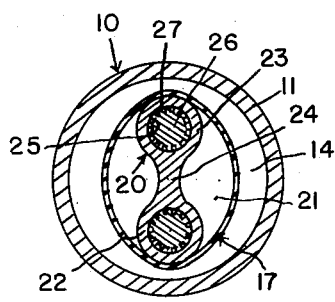
FIG. 3 is a view in transverse section along line 3—3 of FIG. 2.

Referring first to FIGS. 1, 2 and 3 of the drawings, an accumulator 10 is shown therein in accordance with one embodiment of the invention. It comprises a rigid external cylindrical casing 11 of substantial radial wall thickness, which casing is radially formed at one end to provide an annular retaining flange 12 defining a central end opening 13 of substantial diameter. The opposite end of the casing 11 is equipped with retaining provisions of a different type, to be described, including provisions for pressurizing the interior of the casing.

An end header member or plug 14 in the form of an aluminum casting of special cross sectional shape is disposed within the radial flange 12, being axially restrained by the latter; and a generally similar opposite end header member or plug 15 is disposed within the opposite end of the casing 11, being axially restrained by a radially flanged, annular cap or retaining ring 16 applied to the casing.

The reference numeral 17 generally designates an elongated tubular diaphragm of synthetic rubber or like flexible or elastically distortable material such as neoprene, proof against attack by hydrocarbonous or other fluids to be handled by the accumulator. For the purpose of clamping and restraining the ends of the diaphragm 17, the end plugs 14, 15 are each provided with an annular recess 18 about their outer end periphery, which recesses receive and clamp against the casing 11 and its end flanges an enlarged annular bead 19 at either end of the tubular diaphragm. Thus, the interiors of the casing 11 and diaphragm 17 are effectively sealed fluid tight at their ends.

The reference numeral 20 generally designates an elongated, fluid permeable distributor core of special outline (as depicted in FIG. 3) which is disposed within the tubular diaphragm 17 to inwardly sustain the same, while permitting radial flow of liquid through the core in either direction. The transverse cross section of this core 20 corresponds to that of the inner ends of the header members or plugs 14, 15 which directly abut its opposite ends; and the plugs have surfaces 21 which are mildly curved radially and axially outwardly from these abutting zones, to sustain the diaphragm 17 in its innermost position without contact with any sharp surface.

In the embodiment of the invention shown in FIGS. 1, 2 and 3, the fluid permeable core 20 is constituted by a multiplicity of thin wafers 22 disposed in direct end to end engagement with one another. They are preferably fabricated of a wrinkled or corrugated material so that when positioned in endwise juxtaposition, flow passages of very limited individual size extend radially of the core, and the large number of such passages permit a relatively unimpaired radial liquid flow in the operation of the accumulator.

As illustrated in FIG. 3, the individual wafers 22 are of a nodal type outline, best described as being in the cross sectional form of a dumbbell or the numeral 8. They include enlarged outer end knobs, protuberant portions or nodes 23, and a connecting spacer portion 24 of relatively restricted width.

Each of the longitudinally extending knob enlargements constituted by the assembled nodes 23 is hollow in cross section, having an elongated cylindrical bore or passage 25 receiving an elongated flow control member 26. This member may be fabricated of aluminum or other lightweight, corrosion resistant material, and is provided with a multiplicity of parallel, longitudinally extending external flutes 27 along its length 28.

As so assembled on the two fluted flow control members 26, the core 20 constituted by the wafers 22 is unitary in character, and is positively sustained within the tubular diaphragm 17 by the elongated control members 26. To this end, each of the end plugs or headers 14, 15 is provided with diametrically spaced recesses 30 in its inner shaped ends, which recesses receive the fluted ends of the flow control members 26. It will be noted that these ends of the members 26 are reduced in diameter at 31, providing portions having end engagement with the respective plugs 14, 15.

At least one of the end plugs, i.e., that designated 14 in FIGS. 1 and 2, is provided with a pair of liquid flow passages 32 diverging axially inwardly and radially outwardly to the recesses 30 from a centrally threaded passage 33 adapted to receive a liquid fitting (not shown). Accordingly, when the accumulator 10 is connected to a source of pressure at the threaded passage 33, liquid under pressure may flow through the divergent passages 32 and along the external, longitudinal control member flutes 27.

Thus, throughout the length of the cylindrical bores 25 which receive the control members 26, the liquid is uniformly distributed for a flow radially outwardly between the wafers 22 of the core 20. The longitudinal flow is a well controlled one with minimum turbulence, and full advantage is taken of the multiplicity of liquid distributing spaces between the juxtaposed wafers 22 of the core. Thus, diaphragm 17 distends against the pneumatic pressure in the space 22 between it and casing 11 to store energy and to suppress surges or pulsations from the liquid pressure supply source. Discharge of the liquid under relatively uniform, high and stable pressure to a hydraulic system or to a motor or other instrumentalities to be supplied is insured.

In accordance with the embodiment of the invention shown in FIGS. 1 and 2, the restraining cap 16 at the left hand end of casing 11 is in the form of an integral ring 35 sleeved with a relatively close fit over the end of the casing, and fixedly secured thereto, as by a silver solder or similar connection at 36. An extreme end of the casing is recessed annularly to receive a resilient O-ring 37 or like sealing member acting to prevent the outward escape of air pressure from the space between casing and diaphragm, once the space has been charged.

For the purpose of so charging the space, an annular plug restraining flange 38 of the cap 16 is provided with a threaded opening 39, and a restricted passage 40 from that opening to the space in which O-ring 37 is disposed. The passage 339 is normally closed and sealed by a threaded plug 41; and with this plug removed the passage 39 is adapted to have applied thereto a suitable air pressure fitting.

The O-ring will permit a desired inflow of air, and there is sufficient radial clearance between the closure cap 16 and casing 11 to permit a charging flow of air therebetween. Casing 11 has one or more radial openings 42 receiving a porous sintered metal plug element, enabling communication to be established with the exterior for pneumatically charging the latter with air pressure.

As a safety provision, a radial opening 44 is provided through the closure cap 35, being normally sealed by a rupture disk 45. Hence, in the event of excessive pressure, for example under a maximum expansion of the diaphragm 17, the disk 45 will fail and relieve the excess.

Figure 4:
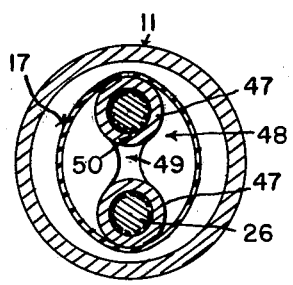
FIGS. 4 and 5 are similar views in transverse section, showing modified arrangements of fluid permeable core structures of the nodal or radial protuberance type.

As indicated above, in the embodiment of FIGS. 1, 2 and 3 the core 20 is constituted by a multiplicity of endwise juxtaposed disks 22 of the outline of numeral 8. In the embodiment of FIG. 4, a generally similar result is accomplished by winding a ribbon 47 of corrugated paper, crinkled metal, or other suitable stock to build up a necessary length of the core, which is in this case generally designated 48. The cylindrical interior bores of the thus constituted enlarged node portions each receive a fluted supporting and flow control member 26 as described in connection with FIGS. 1, 2 and 3. In this embodiment, the two enlarged core members are braced and held uniformly separated from one another along their entire length by an elongated central separating member 49, this member having opposed concave seats 50 to receive the arcuate contour of the enlargements. Of course, the basic support of the thus built up core is at the ends of the fluted control members.

Figure 5:
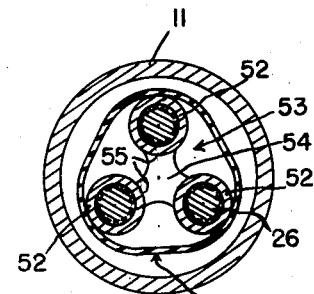

An arrangement similar to that of FIG. 4 is involved in the further embodiment shown in FIG. 5 of the drawings, with the exception that there are three of the nodal or enlarged knob portions 52 of the core structure, generally designated 53. Each of these components may be formed of a wound corrugated ribbon to provide the necessary multiplicity of distributor passages; and a three-pronged, spider-like separator 54 is employed, having concave seats 55 to receive the members 52.

All of the forms of FIGS. 1, 4 and 5 provide for maximum flexure of the diaphragm 17, without destructive extrusion action thereon in its contracted and supported condition, and with optimum longitudinal and radial liquid flow through the respective cores 20, 48 and 53.

Figure 6:
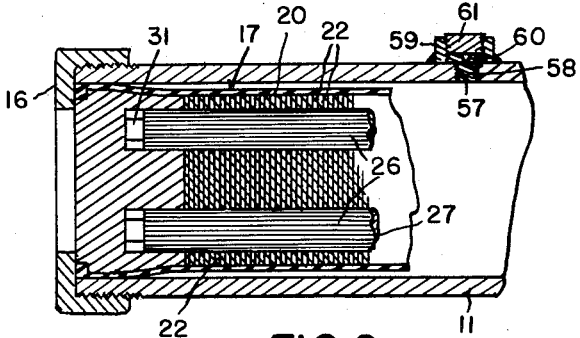
FIG. 6 is a fragmentary view in axial section similar to FIG. 2, showing a modified arrangement for pressurizing the accumulator externally of its flexible diaphragm.

A still further modification of the invention, illustrated in FIG. 6, is shown as employing a core 20 constituted by a multiplicity of juxtaposed wafers of numeral 8-shaped outline, as in the embodiments of FIGS. 1, 2 and 3. However, a different type of pneumatic charging provision is incorporated, in the form of a radially threaded opening 57 formed directly in the wall of the casing 11, which opening is filled by an insert 58 of rubber or like material adapted to be penetrated by a hypodermic type member (not shown) connected to a suitable source of air pressure. Once the casing is charged in this fashion, the insert 58 seals itself against escape of air.

In order to prevent the insert 58 from cold flowing out of the opening 57 under internal gas pressure, an internally threaded adapter ring 59 is welded to the exterior of the casing, concentrically of the opening 57; and a centrally apertured metal disk 60 is slipped or threaded into this adapter, its aperture receiving the hypodermic needle while the disk restrains insert 58 against cold flowing. A restraining plug 61 may be threaded into the adapter 59 on top of the disk 60, being removable for recharging of the space 20 as desired.

An accumulator of simplified construction and low cost of production is provided, in which two or more longitudinal liquid flow passages or bores are provided throughout the length of the respective permeable cores 20, 48 or 53, for ample liquid handling capacity and conducive to a smooth, non-turbulent, and uniform flow and distribution of the liquid in both directions radially and axially. As in the accumulator of my patent identified above, the wound or juxtaposed wafer construction of the core permits the desired capacity of radial flow in either direction, while preventing damage of the tubular diaphragm 17 due to inward extrusion. The enlarged node shape of the various embodiments of the permeable core will, as is clear from FIGS. 3, 4 and 5, permit a maximum extensile and contractile movement of the sleeve, without any possibility of damage thereto by contact with a sharp surface.

It is seen from the above that the rod-like members 26 have four functions, i.e.:

(1) While the accumulator is being charged, the rods 26 permit an even distribution of liquid throughout the entire length of the permeable tube, thus preventing any localized pressure build-up and consequent external rupture of the permeable tube.

(2) While the accumulator is being discharged, the rods 26 collect the liquid evenly, throughout the entire length of the permeable tube.

(3) During a maximum delta pressure condition, such as a complete evacuation of liquid pressure, the rods prevent the internal collapse of the permeable tube.

(4) From the standpoint of construction, the rods position, both radially and axially, the header members 14 and 15.

Figure 7:
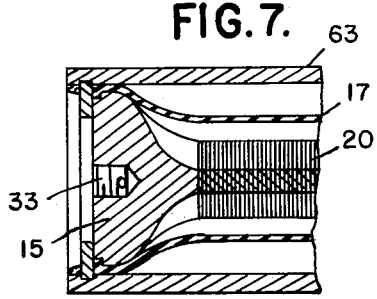
FIGS. 7 through 12 are fragmentary views in axial section corresponding to FIG. 1, showing various alternative provisions for assembling an end retaining ring to a casing member to constitute the casing structure of an accumulator.
Figure 8:
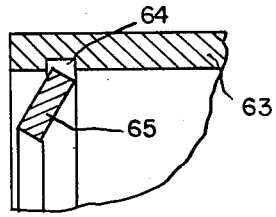

FIGS. 7 through 12 show various alternative procedures for the production of an accumulator casing structure different from those of FIGS. 1, 2 and 6; and these alternative forms will, it is to be understood, receive internal diaphragm sustaining core structure of the sort shown in FIGS. 1 through 6. Accordingly, in FIGS. 7 and 8, showing features of this structure, parts corresponding to those of FIGS. 1 through 6 are designated by corresponding reference numerals, and further description is dispensed with.

Figure 9:
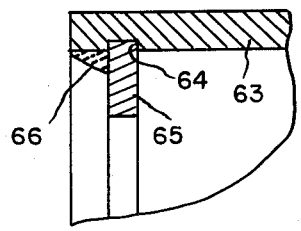

In the adaptations of FIGS. 7, 8 and 9, the casing is constituted of an elongated tubular casing member 63 of suitable width which is cylindrical throughout its length. It is provided adjacent its ends with an annular recess or groove 64; and a flexible retainer ring 65 is sprung into place in this groove, by distorting the ring 65 somewhat as shown in FIG. 8. As shown in FIG. 8, the ring may be of proper design and strength to retain itself in the groove, axially sustaining the adjacent end plug 15 and associated diaphragm and core parts. On the other hand, in the further modified form shown in FIGS. 7 and 9, the ring 65 and casing 63 are provided with an annular weld at 66 around their external peripheral joint.

Figure 10:
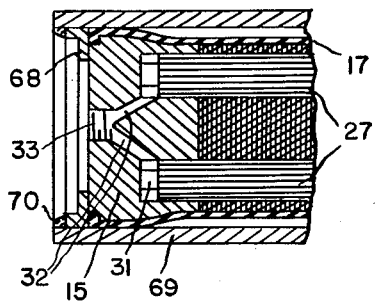
Figure 11:
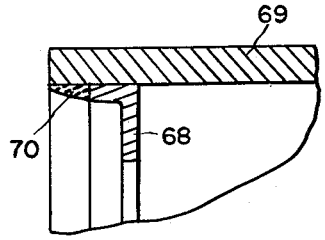

FIGS. 10 and 11 illustrate a further modified form, in axial section similar to FIGS. 2 and 6, in which a flange retainer ring 68 of L-shaped cross section is fitted within the end of a cylindrical casing member 69, under a relatively tight fit, and, so assembled, is annularly welded at 70 to the inner wall of the casing member.

Figure 12:
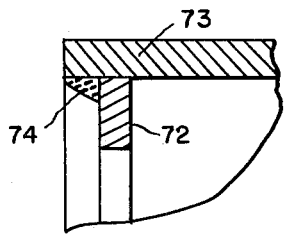

FIG. 12 shows a welded assembly similar to that of FIGS. 8 and 9, employing a flat annular retaining ring 72 fitted within the end of the cylindrical casing 73 and secured in the casing by an annular weld 74, the groove or recess in the casing, per FIGS. 7 and 9, being omitted.

What I claim as my invention is:

1. An accumulator comprising an elongated tubular casing closed at the ends, a flexible tube of a material impermeable to gases and liquids extending axially within said casing and cooperating with said casing to form a chamber around said tube, a backing for said tube comprising a core supported within said tube, said core having a plurality of elongated, liquid permeable, angularly spaced tubular portions, each tubular portion having a hollow interior, the hollow interiors of said respective tubular portions being separate and spaced from each other, said tubular portions extending lengthwise of said casing with their axes displaced radially from the axis of said casing, the external surfaces of said tubular portions being convex, said core having a central portion bridging the space between said tubular portions and having external surfaces shaped to blend smoothly with the external surfaces of said tubular portions for the uniform support of said tube when collapsed without sharp bends, and means providing a liquid passage to the hollow interiors of said tubular portions.

2. An accumulator comprising an elongated cylindrical casing closed at the ends, a flexible cylindrical tube of a material impermeable to gases and liquids extending coaxially within said casing and cooperating therewith to form a chamber around said tube, a backing for said tube comprising an externally smooth surfaced core supported within said tube, said core having a plurality of elongated, liquid permeable, angularly spaced tubular portions, each tubular portion having a hollow interior, the hollow interiors of said respective tubular portions being separate and spaced from each other, said tubular portions extending lengthwise of said casing with their axes displaced an equal distance from and paralleling the axis of said casing, the external surfaces of said tubular portions being convex, said core having a central portion bridging the space between said tubular portions and having external surfaces shaped to blend smoothly with the external surfaces of said tubular portions for the uniform support of said tube when collapsed without sharp bends, and means providing a passage for liquid communicating with the interiors of said tubular portions.

3. The accumulator defined in claim 2 wherein said tubular portions and central portion of said core are integral with one another and said tubular portions constitute radial extensions of said central portion, said tubular portions being of uniform wall thickness throughout more than 180 degrees of circumference.

4. The accumulator defined in claim 2 wherein said tubular portions of said core are in the form of individual cylindrical tubes of uniform wall thickness.

5. An accumulator comprising an elongated cylindrical casing, end members closing the ends of said casing, a flexible cylindrical tube of a material impermeable to gases and liquids extending coaxially within said casing and cooperating therewith to form a chamber around said tube, a backing for said tube comprising an externally smooth surfaced core supported within said tube, said core having a plurality of equi-angularly spaced, liquid permeable tubular portions, each tubular portion having a hollow interior, the hollow interiors of said respective tubular portions being separate and spaced from each other, said tubular portions extending lengthwise of said casing with their axes displaced an equal distance from and paralleling the axis of said casing, elongated members extending through the hollow interiors of said respective tubular portions and connected to said end members to support said tubular portions, said hollow interiors of said tubular members cooperating with the elongated members therewithin to define liquid passages extending throughout the lengths of said hollow interiors, the external surfaces of said tubular portions being convex, said core having a central portion bridging the space between said tubular portions and having external surfaces shaped to blend smoothly with the external surfaces of said tubular portions for the uniform support of said tube when collapsed without sharp bends, and means providing a passage for liquid communicating with said liquid passages.

6. The accumulator defined in claim 5 wherein said end members are received in said casing and the ends of the tube are clamped between said casing and the radially outer portions of said end members.

7. The accumulator defined in claim 5 wherein said tubular portions and central portion of said core are integral with one another and said tubular portions constitute radial extensions of said central portion, said tubular portions being of uniform wall thickness throughout more than 180 degrees of circumference.

8. The accumulator defined in claim 5 wherein said tubular portions of said core are in the form of individual cylindrical tubes of uniform wall thickness.

9. An accumulator comprising an elongated tubular casing closed at the ends, a flexible tube of a material impermeable to gases and liquids extending axially within said casing and cooperating with said casing to form a chamber around said tube, a backing for said tube comprising a core supported within said tube, said core having a plurality of elongated, angularly spaced tubular portions, each tubular portion having a hollow interior, the hollow interiors of said respective tubular portions being spaced from each other, said tubular portions extending lengthwise of said casing with their axes displaced radially from the axis of said casing, the external surfaces of said tubular portions being convex, said core having a central portion bridging the space between said tubular portions and having external surfaces shaped to blend smoothly with the external surfaces of said tubular portions for the uniform support of said tube when collapsed without sharp bends, and means providing for the passage of liquid to the hollow interiors of said tubular portions, said core being constructed to provide liquid communication between the hollow interiors of said tubular portions and the space between said core and said tube.

10. An accumulator comprising an elongated tubular casing closed at the ends, a flexible tube of a material impermeable to gases and liquids extending axially within said casing and cooperating with said casing to form a chamber around said tube, a backing for said tube comprising a core supported within said tube, said core having a plurality of elongated, angularly spaced tubular portions, each tubular portion having a hollow interior, the hollow interiors of said respective tubular portions being spaced from each other, said tubular portions extending lengthwise of said casing with their axes displaced radially from the axis of said casing, said core having a central portion bridging the space between said tubular portions and having external surfaces shaped to blend smoothly with the external surfaces of said tubular portions for the uniform support of said tube when collapsed without sharp bends, and means providing for the passage of liquid to the hollow interiors of said tubular portions, said core being constructed to provide liquid communication between the hollow interiors of said tubular portions and the space between said core and said tube.

References Cited in the file of this patent

UNITED STATES PATENTS

| 2,583,231 | Ragland | Jan. 22, 1952 |
| 2,760,518 | Peet | Aug. 28, 1956 |
| 2,805,684 | Love | Sept. 10, 1957 |
| 2,841,180 | Pier | July 1, 1958 |
| 2,841,181 | Hewitt et al. | July 1, 1958 |
| 2,861,595 | Pier | Nov. 25, 1958 |

FOREIGN PATENTS

| 957,014 | Germany | Jan. 24, 1957 |